United States Patent [19]

Cerny et al.

[11] 4,242,240
[45] * Dec. 30, 1980

[54] COMPOSITIONS INTENDED FOR THE FLAMEPROOFING OF PLASTICS

[75] Inventors: Jacqueline Cerny; Gilbert Vivant, both of Lyons, France

[73] Assignee: Rhone-Poulenc Industries, Paris, France

[*] Notice: The portion of the term of this patent subsequent to May 30, 1995, has been disclaimed.

[21] Appl. No.: 889,337

[22] Filed: Mar. 23, 1978

Related U.S. Application Data

[63] Continuation of Ser. No. 690,842, May 28, 1976, abandoned.

[30] Foreign Application Priority Data

Mar. 19, 1976 [FR] France ................................ 76 08607

[51] Int. Cl.$^2$ ............................................... C08L 1/10
[52] U.S. Cl. .................................... 260/14; 260/37 N; 260/38; 260/40 R; 260/42.56; 260/45.7 P; 260/DIG. 24
[58] Field of Search ............ 260/14, 38, 42.56, 45.7 P, 260/831, 838, 840, 841, 842, 844, 845, 846, 848, DIG. 24; 428/407; 427/221

[56] References Cited

U.S. PATENT DOCUMENTS

| 3,386,851 | 6/1968 | Harlan | 427/221 |
| 3,883,475 | 5/1975 | Racky et al. | 260/45.75 E |
| 3,962,461 | 6/1976 | Sato et al. | 427/221 |

OTHER PUBLICATIONS

Kirk–Othmer Encyclopedia of Chem. Tech. (2nd ed.), vol. 13; 1967; pp. 440, 441, 443.
Knapsack; Chem. Abs.; 71, 50805c; 1969.
Vollbracht; Chem. Abs.; 72, 112687x; 1970.
Dany et al.; Chem. Abs.; 75, 118977a; 1971.
Whitehouse et al.; Phenolic Resins; 1968; p. 56.
Condensed Chem. Dict.; 5th ed.; 1956; p. 619; Reinhold Pub.

Primary Examiner—Lewis T. Jacobs
Attorney, Agent, or Firm—McDougall, Hersh & Scott

[57] ABSTRACT

Compositions based on red phosphorus and a phenol-formaldehyde polycondensate.

These compositions contain from 50 to 95% by weight of red phosphorus and from 5 to 50% by weight of a thermoplastic phenol-formaldehyde polycondensate of molecular weight between 120 and 1,500, wherein the molar ratio of formaldehyde to phenol is between 0.7 and 0.9.

These compositions are intended for the flameproofing of plastics and do not evolve toxic products during use.

3 Claims, No Drawings

COMPOSITIONS INTENDED FOR THE FLAMEPROOFING OF PLASTICS

This is a continuation, of application Ser. No. 690,842, filed May 28, 1976, now abandoned.

The present invention relates to compositions, based on encapsulated red phosphorus, for the flameproofing of plastics.

Numerous patents cover the use of red phosphorus for the flameproofing of plastics; red phosphorus is in fact a very good flameproofing agent. For a given activity it is necessary to use smaller amounts of phosphorus than, for example, of halogenated derivatives.

Furthermore, the use of phosphorus leads to better mechanical properties and does not interfere with the electrical properties of the plastics in which it is incorporated.

However, this application is restricted by the dangers incurred, namely pollution hazards and difficulties of use with complete safety. In fact, the presence of traces of water in almost all the polymers causes, under the influence of the heat required to process these polymers, the formation of phosphine, which is very toxic and which ignites spontaneously in air.

To overcome these disadvantages French Pat. No. 2,074,394 has provided incorporating into the thermoplastic, which may be reinforced with glass fiber, red phosphorus impregnated with a lactam containing 4 to 12 carbon atoms, for example caprolactam, in an amount of 1 to 20% relative to the weight of the polymer.

However, the essential disadvantage of this process is the hygroscopic nature of the lactams, so that the presence of water in the mixture causes the formation of very toxic phosphine, which ignites spontaneously in air, especially at the processing temperatures of the polymers.

German patent application No. 2,308,104 has claimed compositions of thermoplastics flameproofed with red phosphorus and containing metal oxides to prevent any evolution of phosphine during storate at ambient temperature. However, the addition of metal oxides is insufficient to prevent the evolution of phosphine which takes place at a high temperature.

Belgian Pat. No. 817,020 teaches that if compositions of polyolefines, flameproofed with a mixture of red phosphorus and a nitrogen-containing organic compound which carbonizes on exposure to a flame, are processed at between 170° and 230° C., phosphine is evolved. To reduce this evolution, this patent claims the use of stabilizers based on amidosulphonic acid, a paraffin oil or silicone oil, and pentaerythritol.

It was necessary to find a simple means which made it possible to process plastic compositions containing red phosphorus in the complete absence of evolution of phosphine, especially if the plastics are intended for the production of shaped articles.

It has now been found that this latter object is achieved if compositions intended for the flameproofing of plastics are used which are characterized in that they contain:

(a) from 50 to 95% by weight of red phosphorus in the form of a powder and (b) from 5 to 50% by weight of a thermoplastic phenol-formaldehyde polycondensate of molecular weight between 120 and 1,500 and preferably between 450 and 700, wherein the molar ratio of formaldehyde to phenol is between 0.7 and 0.9.

Red phosphorus is to be understood as including all the colored allotropic varieties, which are sold commercially under the name of red phosphorus and which can contain up to 3% of metal oxides or metal salts as stabilizers.

This red phosphorus must be in the form of particles having a mean diameter of less than $200\mu$ and preferably less than $100\mu$. The use of particles which are only a few microns in diameter makes it possible to flameproof spun articles for textile usage.

The polycondensates which are suitable according to the invention are well known. They are described, inter alia, in "Encyclopedia of Polymer Science and Technology", volume 10, page 4 et seq., 1969 edition, from Intersciences Publishers.

They can be obtained by acid or alkaline catalysis. They are known by the name of "NOVOLAC" resins.

The compositions according to the invention can be prepared in a simple manner by mixing the two components in the cold and then heating the mixture to a temperature slightly above the melting point of the polycondensate. It is found that the polycondensate homogeneously coats the phosphorus particles.

The polycondensates can also be deposited on the surface of the phosphorus particles. For this purpose, it is possible to follow numerous encapsulation processes, such as those described in "Encyclopedia of Polymer Science and Technology", volume 8, page 719 et seq., from Interscience Publishers. These processes are essentially of a chemical or physical nature. Amongst the commonest processes there may be mentioned; coacervation in the aqueous phase or interfacial phase, precipitation in an organic phase by addition of a non-solvent, spray drying, the use of a fluidized bed, interfacial polymerization or polymerization in situ in the vapor phase or in a moist phase, vacuum deposition, electrostatic deposition as well as numerous other processes based on phase separation methods or on interfacial reaction methods.

In order that the protection provided by the polycondensate shall be satisfactory, the amount used must be between 5 and 50% by weight relative to the red phosphorus.

It is known, furthermore, that the addition of metal oxides or metal salts stabilizes the red phosphorus; the red phosphorus sold commercially usually contains these additives. The addition of metal oxides, which makes it possible to reduce possible evolution of phosphine, falls within the scope of the invention. The metal oxides which give the best results are the oxides of copper, zinc, silver, iron, antimony, vanadium, tin, titanium or magnesium, but preferably copper oxide is used.

The amounts of metal oxides employed can vary according to the amount of polycondensate used, according to the conditions of use of the synthetic resins as well as according to the nature of the synthetic resins. Usually, up to 100% by weight, relative to the red phosphorus, of metal oxide can be used.

Very many synthetic polymers are used to obtain shaped articles which more and more frequently must be flameproofed. Numerous compositions based on thermoplastic polymers, thermosetting polymers or elastomeric polymers can be flameproofed according to the invention. Amongst the thermoplastic polymers there may be mentioned:

polyolefins such as high density or low density polyethylene, polypropylene, polyfluoroethylene and ethylenepropylene copolymers, polyvinyl compounds such as polyvinyl chloride or vinyl chloride copolymers, polystyrenes and acrylonitrile-butadiene-styrene copolymers, polyamides such as poly(hexamethylene adipamide), polycaprolactam, poly(hexamethylene sebacamide), polyundecanamide, polylauryllactam, poly(hexamethylene azelamide) and poly (hexamethylene dodecanediamide), saturated polyesters such as poly(ethylene glycol terephthalate) or poly(butylene glycol terephthalate), polyacetals and polyacrylics, such as poly(methyl methacrylate), and cellulosic esters, polyurethanes or polyamide-imides.

Amongst the thermosetting polymers there may be mentioned the phenolic resins, the aminoplasts, the unsaturated polyesters, the polyepoxides and the polyimides.

Various elastomers can also be flameproofed using the compositions according to the invention. For example, there may be mentioned natural or synthetic rubbers, silicones and polyurethane elastomers.

All these plastics, when they are intended in particular for the production of shaped articles, are usually employed with various adjuvants, namely reinforcing fillers such as glass fibers, fillers intended to impart specific characteristics to the dhaped articles, or inert fillers such as kaolin or talc, antioxidants, various stabilizers, dyestuffs or pigments. A content of flameproofing composition of 0.2 to 20% by weight relative to the plastic is usually selected to obtain a suitable flameproofed effect.

The use of encapsulated red phosphorus particles offers numerous advantages amongst which there may be mentioned the ease of handling before and during introduction into the polymer compositions, the reduction of pollution hazards during the preparation of the compounds, and above all the absence of evolution of phosphine during processing, principally when working at temperatures above 200° C.

In the examples which follow and which are given without implying a limitation, the polymer to be flameproofed which was chosen, was a polyamide 6,6, the moisture absorption of which is, with the exception of the cellulosics, amongst the highest exhibited by polymers and, under the action of heat and in the presence of red phosphorus, leads to the greatest evolutions of phosphine.

EXAMPLE 1

2,250 g of a red phosphorus powder having a mean particle size of 20 to 30μ are mixed with 1,500 g of a phenol-formaldehyde polycondensate powder, which has a melting point of about 80° C. and a molecular weight of 800 and is marketed under the name of RESOPHENE 71 DA. These powders are intimately mixed by agitation on rollers overnight. The mixture is then poured, at a thickness of about 1 cm, onto plates covered with aluminum foil. The whole is placed in an oven at 130° C. for 3 hours. Sheets are obtained and are broken into fragments. It is found that the edges do not release red phosphorus powder on rubbing and that the phosphorus particles have been coated with the NOVOLAC resin.

30 g of this coated red phosphorus, 6 g of copper oxide powder and 264 g of poly(hexamethylene adipamide) filled with glass fibers (30%) and having a mean molecular weight of 20,000 and an inherent viscosity, in meta-cresol, of 1.3, are introduced into a one-liter double-walled autoclave equipped with a spiral scraper-type stirrer revolving at 20 rpm and heated by a heating fluid. The mixture is heated gradually, while stirring, so as to reach a temperature of 285° C. after one hour. It is maintained at this temperature for 1 hour.

To determine the phosphine which may be evolved, the gases leaving the autoclave are trapped in two 1,000 cm³ flasks in series, containing 750 cm³ of a 2% strength aqueous solution of mercury chloride, and the acid formed is determined in the presence of methyl orange. This method of determination has been described by M. WILMET in "Compterendus de l'Academie des Sciences" 185 (1927), page 206.

The weight of phosphine evolved, relative to 1 g of red phosphorus employed, is 1 mg.

A blank experiment carried out under the same conditions but with non-coated red phosphorus (18 g) gives an evolution of phosphine of 17 mg per gram of red phosphorus employed.

EXAMPLE 2

A single-screw laboratory extruder, of which the screw has a length of 415 mm and a diameter of 15 mm, is used. This extruder is equipped with a cylindrical die having a diameter of 3 mm. The barrel temperatures are as follows: 265° C. at the material inlet, 280° C. at the center and 265° C. at the die.

The following composition is prepared by simple mixing in a rotary mixer:

88.7 g of a compound based on poly(hexamethylene adipamide), having a mean molecular weight of 20,000 and an inherent viscosity, in meta-cresol, of 1.3, and containing 30% by weight of glass fibers, 0.3 g of polyalkylene glycol laurate, 1 g of copper oxide and 10 g of the mixture of red phosphorus and RESOPHENE 71 DA prepared in Example 1.

This composition is introduced into the extruder and a strand is extruded.

During the entire operation, the possible presence of phosphine in various parts of the extruder is tested for, by means of a DRAEGER CH 31,101 tube. Equally, attempts are made to detect phosphine when the strand which has just been extruded, and which is still hot, is broken.

All these tests are negative.

EXAMPLE 3

The procedure indicated in Example 2 is used.

However, the extruder temperatures are as follows: 215° C. at the material inlet, 240° C. st the center and 235° C. at the die.

The following composition is extruded:

87.7 g of poly(butylene glycol terephthalate) granules having a viscosity of 3,500 poises, 0.3 g of polyalkylene glycol laurate, 2 g of copper oxide and 10 g of the flameproofing mixture prepared in Example 1.

As in Example 2, no evolution whatsoever of phosphine is observed.

EXAMPLE 4

The procedure indicated in Example 2 is used.

The extruder temperatures are as follows: 205° C. at the material inlet, 220° C. at the center and 205° C. at the die.

The following composition is extruded:

88 g of polypropylene having a density of 0.903, a melting point of 165°–170° C. and a melt index (flow rate) of 6 grams per 10 minutes, determined according to Standard Specification ASTM 1238-65 T at 230° C. under a load of 2.16 kg, 2 g of copper oxide and 10 g of the flameproofing mixture prepared in Example 1.

No evolution whatsoever of phosphine is observed.

EXAMPLE 5

The procedure indicated in Example 2 is used.

The extruder temperatures are as follows: 220° C. at the material inlet, 240° C. at the center and 230° C. at the die.

The following composition is extruded:

87.7 g of high-impact polystyrene containing 8% by weight of polybutadiene, the polystyrene having a density of 1.05, a Vicat softening point of 96° C. and a melt index (flow rate) of 4.5 g per 10 minutes, determined according to Standard Specification ASTM 1238-65 T at 200° C. under a load of 5 kg, 0.3 g of polyalkylene glycol laurate, 2 g of copper oxide and 10 g of the flameproofing mixture prepared in Example 1.

No evolution whatsoever of phosphine is observed.

EXAMPLE 6

A solution of 40 g of polycondensate, as described in Example 1, in 150 cm$^3$ of acetone is prepared.

60 g of red phosphorus are added, while stirring, to the collodion thus prepared. After stirring for 5 minutes, this suspension is poured dropwise into 15 l of distilled water stirred by means of a turbine. The coated red phosphorus particles are filtered off, washed with water and then dried in an oven at 60° C. under a vacuum of 100 mm of mercury. 89.5 g of coated red phosphorus powder are obtained.

The procedure indicated in Example 2 is then used, using the following composition:

89.7 g of the same compound as that described in Example 2, 8.95 g of the coated red phosphorus prepared as indicated above, 1 g of copper oxide and 0.3 g of polyalkylene glycol laurate.

In the course of processing this composition, no trace of phosphine is detected.

EXAMPLE 7

The procedure indicated in Example 4 is used, but the flameproofing mixture is replaced by that prepared in Example 6.

No evolution whatsoever of phosphine is observed.

We claim:

1. Compositions intended for the flameproofing of plastics, which do not evolve toxic products during the processing of these plastics, characterized in that they contain:
    (a) from 50 to 95% by weight of red phosphorus in the form of a powder having a mean particle size of less than 200μ;
    (b) from 5 to 50% by weight of a thermoplastic phenol-formaldehyde polycondensate of molecular weight between 120 and 1,500, wherein the molar ratio of formaldehyde to phenol is between 0.7 and 0.9 and in which the particles of red phosphorus are coated with the polycondensate.

2. Compositions according to claim 1, characterized in that they furthermore contain up to 100% by weight, relative to the red phosphorus, of a metal oxide chosen from the group consisting of the oxides of copper, zinc, silver, iron, antimony, vanadium, tin, titanium and magnesium.

3. Flameproofed compositions of plastics, characterized in that they contain from 0.2 to 20% by weight relative to the plastic of a flameproofing composition according to claim 1.

\* \* \* \* \*